United States Patent
Tsubone et al.

(10) Patent No.: US 12,049,103 B2
(45) Date of Patent: Jul. 30, 2024

(54) ROTARY DRIVE DEVICE

(71) Applicants: Nidec-Shimpo Corporation, Nagaokakyo (JP); Honda Motor Co., Ltd., Tokyo (JP)

(72) Inventors: Taihei Tsubone, Nagaokakyo (JP); Kyohei Haizumi, Nagaokakyo (JP); Wataru Yada, Tokyo (JP); Tomokazu Sakamoto, Tokyo (JP); Takeshi Echizenya, Tokyo (JP); Seiji Kato, Tokyo (JP)

(73) Assignees: NIDEC-SHIMPO CORPORATION, Kyoto (JP); HONDA MOTOR CO., LTD, Tokyo (JP)

( * ) Notice: Subject to any disclaimer, the term of this patent is extended or adjusted under 35 U.S.C. 154(b) by 661 days.

(21) Appl. No.: 17/217,641

(22) Filed: Mar. 30, 2021

(65) Prior Publication Data

US 2021/0300109 A1    Sep. 30, 2021

(30) Foreign Application Priority Data

Mar. 31, 2020   (JP) .................................. 2020-064169

(51) Int. Cl.
   *B60B 19/00*   (2006.01)
   *B60B 19/12*   (2006.01)

(52) U.S. Cl.
   CPC .......... *B60B 19/003* (2013.01); *B60B 19/125* (2013.01)

(58) Field of Classification Search
   CPC ........................... B60B 19/003; B60B 19/125
   USPC .......................................................... 180/7.1
   See application file for complete search history.

(56) References Cited

U.S. PATENT DOCUMENTS

| 2011/0070997 A1* | 3/2011 | Gomi ........................ B60B 9/10 476/66 |
| 2012/0061156 A1 | 3/2012 | Takenaka et al. |
| 2015/0162798 A1 | 6/2015 | Ozawa et al. |

FOREIGN PATENT DOCUMENTS

| JP | 2009-213197 A | 9/2009 |
| JP | 2010-260501 A | 11/2010 |
| JP | 2011-063209 A | 3/2011 |
| JP | 5016237 B2 | 9/2012 |
| JP | 5272707 B2 | 8/2013 |
| JP | 6060905 B2 | 1/2017 |

* cited by examiner

*Primary Examiner* — Jacob D Knutson
*Assistant Examiner* — Felicia L. Brittman
(74) *Attorney, Agent, or Firm* — Keating & Bennett, LLP

(57) ABSTRACT

A rotary drive device in a mobile body includes a main wheel and a pair of drive assemblies opposing each other and each driving the main wheel. The main wheel includes driven rollers. One of the pair of drive assemblies includes a motor, a motor case, a drive force transmission, and driving rollers. The driving rollers are in the drive force transmission along a circumferential direction, and contact at least a portion of the driven rollers from one side of the rotary drive device of the axial direction. The drive force transmission rotates to transmit a drive force of the motor to the main wheel via the driving rollers. At least a portion of the motor case opposes at least a portion of the driving rollers in the axial direction.

7 Claims, 14 Drawing Sheets

ROTARY DRIVE DEVICE

CROSS REFERENCE TO RELATED APPLICATION

The present application claims priority under 35 U.S.C. § 119 to Japanese Patent Application No. 2020-064169, filed on Mar. 31, 2020, the entire contents of which are hereby incorporated herein by reference.

1. FIELD OF THE INVENTION

The present invention relates to a rotary drive device.

2. BACKGROUND

A conventional friction type drive device is included as a travel unit in an inverted pendulum type mobile body. The inverted pendulum type mobile body has a lower frame and an upper frame coupled to each other. The friction type drive device is supported by the lower frame of the inverted pendulum type mobile body. The lower frame has a left side wall portion and a right side wall portion facing each other at an interval in a left-right direction.

The friction type drive device has left and right cylindrical mount members. The friction type drive device is arranged between the left side wall portion and the right side wall portion of the lower frame. The left and right mount members are fixedly mounted to the inside of the left side wall portion and the right side wall portion by attachment bolts, respectively. That is, the left and right mount members are fixed to the lower frame concentrically with each other about the center axis.

The left and right mount members rotatably support left and right circular drive disks by cross roller bearings on the outer circumference of the cylindrical portion of the mount member. Each of the left and right drive disks has an outer circular portion having a diameter larger than that of the cylindrical portion of the drive disk. Left and right drive rollers are rotatably attached to the outer circular portion by a roller shaft.

Left and right electric motors are arranged inside the cylindrical portions of the left and right drive disks. The output rotation of the left and right electric motors is decelerated by left and right planetary gear devices and is transmitted individually to the left and right drive disks. The left and right planetary gear devices are fixed to rotor shafts of the left and right electric motors with a sun gear as an input member, are fixed to the left and right drive disks with a ring gear as an output member, and are fixed to the mount member with a pinion carrier as a reaction member, thereby providing a reduction gear. In the left and right electric motors, outer housings incorporating stator coils and the like are fixed to the left and right mount members by bolts.

However, the conventional friction type drive device is fixedly mounted to the left side wall portion and the right side wall portion of the lower frame of the inverted pendulum type mobile body by using the left and right mount members, respectively. Therefore, a space for arranging the left and right mount members is required, and an extra space may be generated between the inner circumferential surface of the cylindrical portion of the mount member and the outer housing of the electric motor. In addition, when an electric motor having a size that does not fit inside the cylindrical portion of the drive disk is mounted, a mount member having a larger size is required, and hence there is a possibility that the interval between the attachment position on the left side wall portion and the attachment position on the right side wall portion, i.e., the interval between the left side end of the left mount member and the right side end of the right mount member is further increased. As a result, there is a possibility that an extra space is required for attaching the friction type drive device to the lower frame of the inverted pendulum type mobile body.

SUMMARY

An example embodiment of a rotary drive device of the present disclosure is provided in a mobile body. The rotary drive device includes a main wheel and a pair of drive assemblies. The main wheel is rotatable about a rotation axis. The pair of drive assemblies oppose each other in an axial direction along the rotation axis, and each of the pair of drive assemblies drives the main wheel. The main wheel includes a plurality of driven rollers arranged along a circumferential direction with respect to the rotation axis. A first drive assembly, which is one of the pair of drive assemblies, includes a first motor, a first motor case, a first drive force transmission, and a plurality of first driving rollers. The first motor case accommodates the first motor. The first drive force transmission rotates about the rotation axis. The plurality of first driving rollers are in the first drive force transmission along the circumferential direction, and contact at least a portion of the plurality of driven rollers from one side of the rotary drive device in the axial direction. The first drive force transmission rotates to transmit the drive force of the first motor to the main wheel via the plurality of first driving rollers. At least a portion of the first motor case opposes at least a portion of the plurality of first driving rollers in the axial direction. The at least a portion of the first motor case is attachable to a mobile body main body of the mobile body.

The above and other elements, features, steps, characteristics and advantages of the present disclosure will become more apparent from the following detailed description of the example embodiments with reference to the attached drawings.

DETAILED DESCRIPTION

Figure 1:
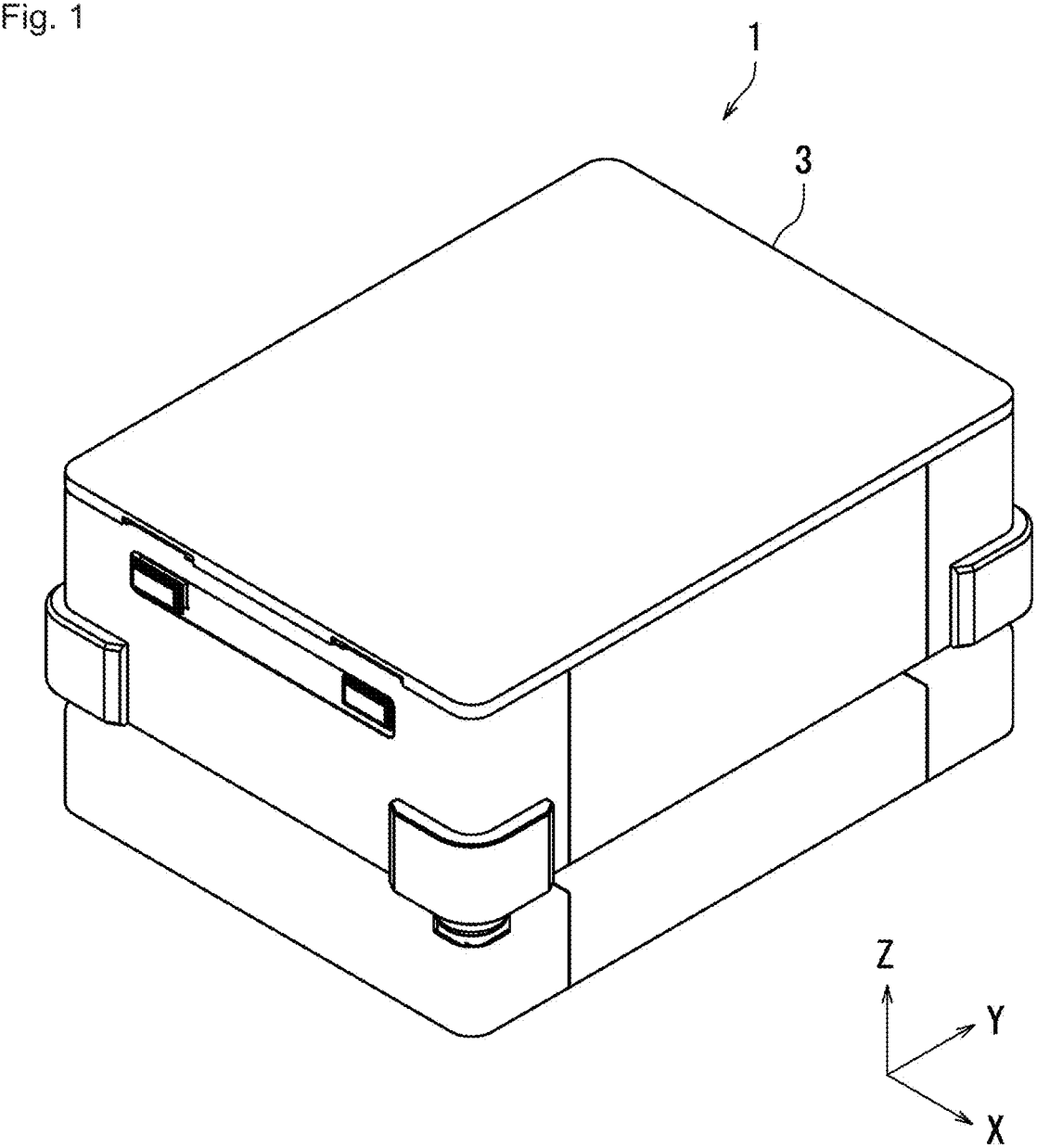
FIG. 1 is a perspective view showing a transport vehicle according to an example embodiment of the present disclosure.

Hereinafter, example embodiments of the present disclosure will be described with reference to the drawings. In the drawings, the same or corresponding parts are given the same reference numerals, and the description will not be repeated. In the drawings, the X, Y, and Z axes of the three-dimensional orthogonal coordinate system are described as appropriate for ease of understanding.

In this description, a direction parallel to a rotation axis AX (e.g., FIG. 3) of a rotary drive device is described as an "axial direction AD". That is, the direction along the rotation axis is described as the "axial direction AD". The direction orthogonal to the rotation axis AX is described as a "radial direction RD". The "radial direction RD" corresponds to an example of a "radial direction relative to the rotation axis". The direction along an arc about the rotation axis AX is described as a "circumferential direction CD". The "circumferential direction CD" corresponds to an example of a "circumferential direction around the rotation axis". Note that a "parallel direction" includes a substantially parallel direction, and an "orthogonal direction" includes a substantially orthogonal direction. Further, "left and right" indicates left and right when the object is viewed from the radial direction RD.

With reference to FIGS. 1 to 14, a transport vehicle 1, a rotary drive device DV, a first drive force transmission device 11A, a second drive force transmission device 11B, a first drive force transmission 110A, and a second drive force transmission 110B according to an example embodiment of the present disclosure will be described. First, the transport vehicle 1 will be described with reference to FIGS. 1 to 3.

Figure 2:
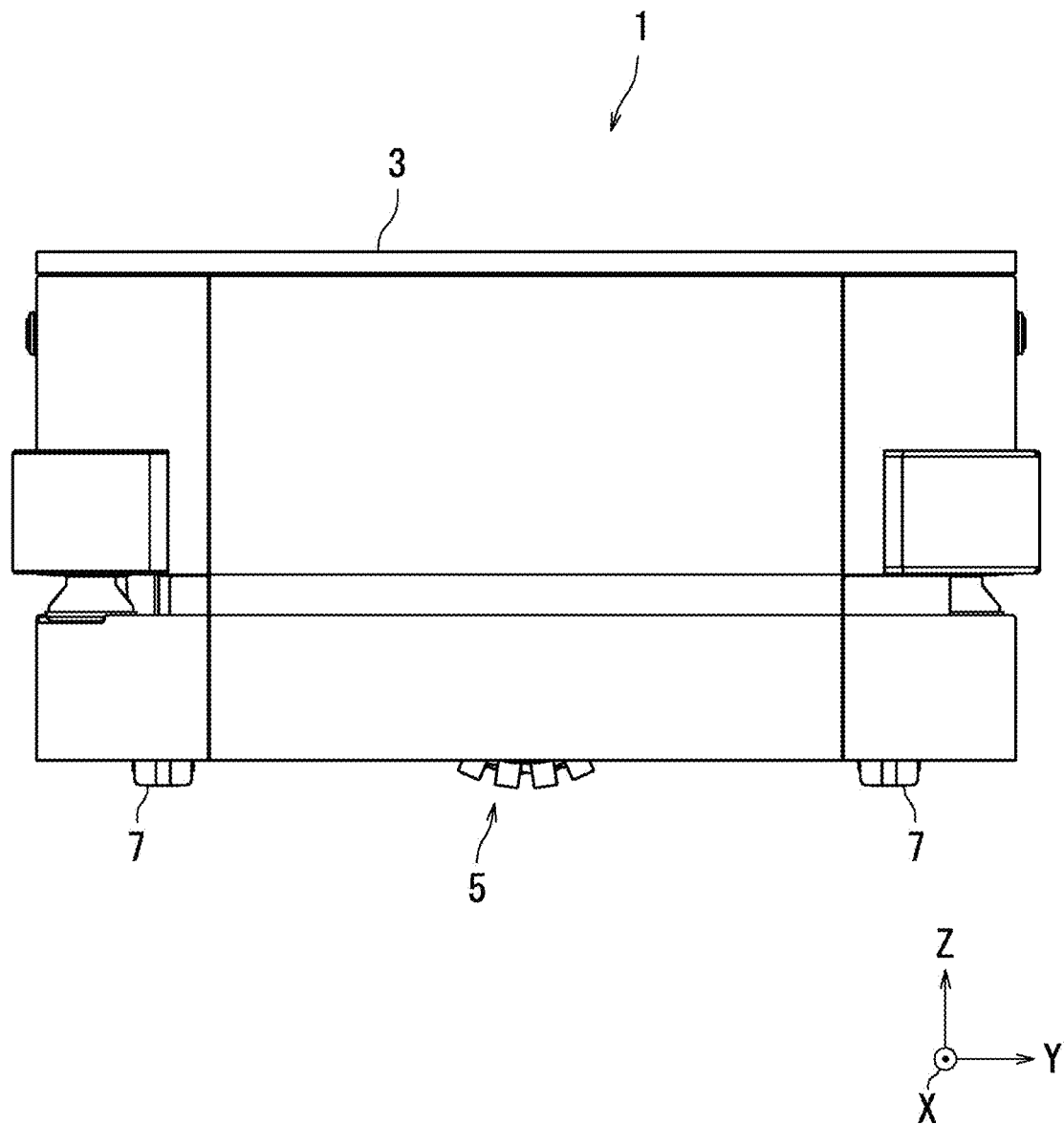
FIG. 2 is a side view showing a transport vehicle according to an example embodiment of the present disclosure.
Figure 3:
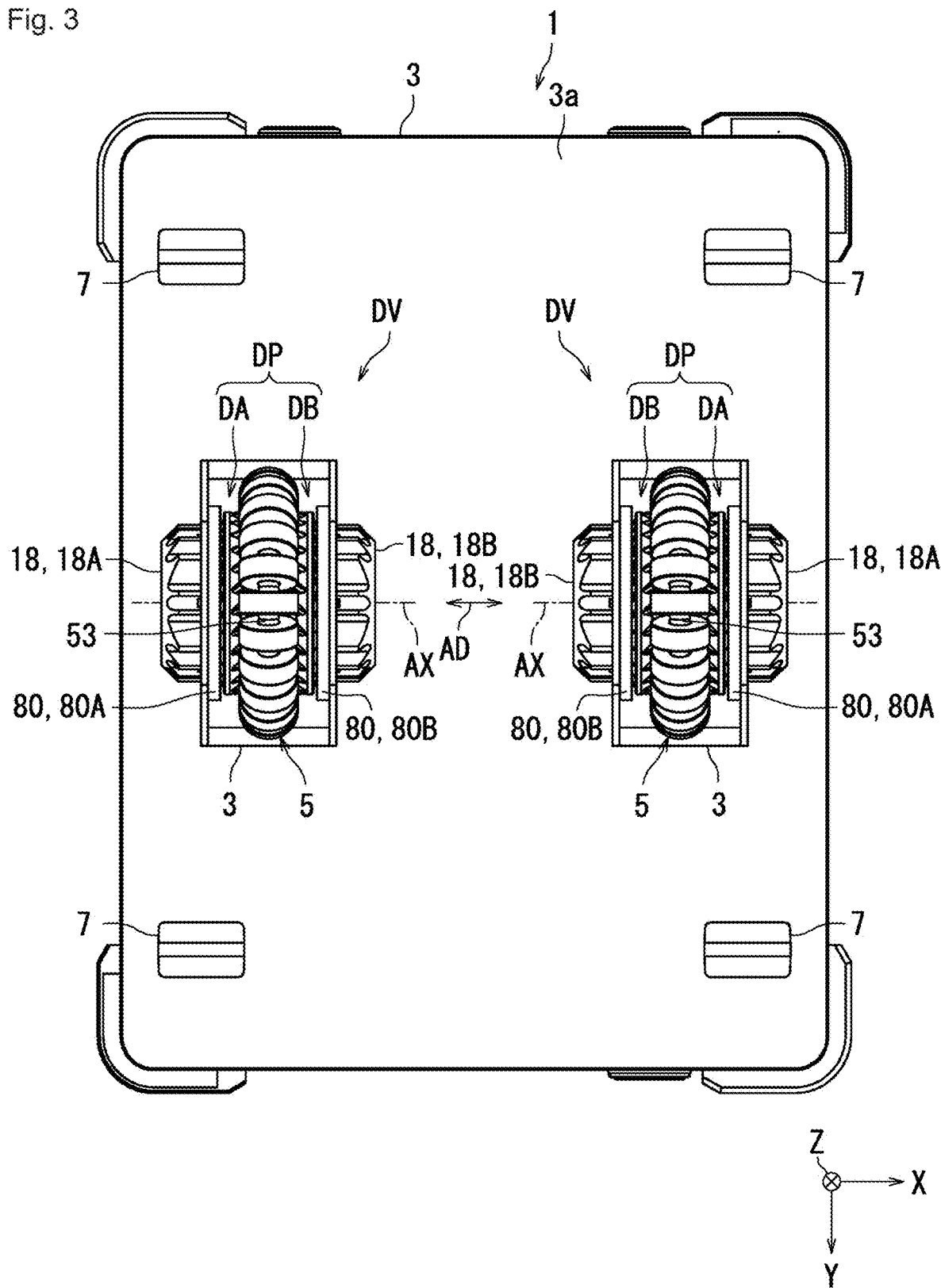
FIG. 3 is a bottom view showing a transport vehicle according to an example embodiment of the present disclosure.

FIG. 1 is a perspective view showing the transport vehicle 1. FIG. 2 is a side view showing the transport vehicle 1. FIG. 3 is a bottom view showing the transport vehicle 1. In FIG. 3, the transport vehicle 1 is viewed from the floor surface or the ground surface side.

The transport vehicle 1 shown in FIGS. 1 and 2 travels on the floor surface or the ground surface. In the present example embodiment, the transport vehicle 1 is an automated guided vehicle (AGV). The transport vehicle 1 is an example of a "mobile body".

As shown in FIG. 1, the transport vehicle 1 has a vehicle body 3. In other words, the vehicle body 3 is provided in the transport vehicle 1. In the examples of FIGS. 1 and 2, the vehicle body 3 has a substantially rectangular parallelepiped shape. However, the shape of the vehicle body 3 is not particularly limited. The vehicle body 3 is an example of a "mobile body main body".

As shown in FIGS. 2 and 3, the transport vehicle 1 further has a plurality of the rotary drive devices DV and a plurality of wheels 7. In the present example embodiment, the transport vehicle 1 has a pair of rotary drive devices DV and four wheels 7. The four wheels 7 are respectively arranged at four corners of a bottom portion 3a of the vehicle body 3. Each wheel 7 rotates with the movement of the vehicle body 3. The pair of rotary drive devices DV rotate independently of each other to move the vehicle body 3. The pair of rotary drive devices DV are arranged at the bottom portion 3a of the vehicle body 3 so that the rotation axis AX of one of the pair of rotary drive devices DV and the rotation axis AX of the other rotary drive device DV are positioned on a straight line.

The pair of rotary drive devices DV have the same configuration. Therefore, one of the pair of rotary drive devices DV will be described below.

As shown in FIG. 3, the rotary drive device DV has a main wheel 5 and a pair of drive assemblies DP. The pair of drive assemblies DP oppose each other in the axial direction AD along the rotation axis AX, and each of them drives the main wheel 5. One of the pair of drive assemblies DP is a first drive assembly DA. The other of the pair of drive assemblies DP is a second drive assembly DB. In other words, the rotary drive device DV includes the main wheel 5, the first drive assembly DA, and the second drive assembly DB. The main wheel 5 is rotatable about the rotation axis AX. Specifically, the first drive assembly DA and the second drive assembly DB drive the main wheel 5. As a result, the main wheel 5 rotates about the rotation axis AX. Therefore, the rotation axis AX is also the rotation axis of the main wheel 5. The first drive assembly DA comes into contact with the main wheel 5 from one side of the main wheel 5 in the axial direction AD to drive the main wheel 5. The second drive assembly DB comes into contact with the main wheel 5 from the other side of the main wheel 5 in the axial direction AD to drive the main wheel 5.

The first drive assembly DA has the first drive force transmission device 11A, a first motor 17A, and a first motor case 18A. The first motor 17A has a first rotary shaft 171A. The first motor case 18A accommodates the first motor 17A. At least part 80A of the first motor case 18A is attachable to the vehicle body 3. The first rotary shaft 171A is an example of an "output shaft of the first motor".

The second drive assembly DB has the second drive force transmission device 11B, a second motor 17B, and a second motor case 18B. The second motor 17B has a second rotary shaft 171B. The second motor case 18B accommodates the second motor 17B. At least part 80B of the second motor case 18B is attachable to the vehicle body 3. The second rotary shaft 171B is an example of an "output shaft of the second motor". The configurations of the second motor 17B and the second motor case 18B are the same as the configurations of the first motor 17A and the first motor case 18A, respectively, of the first drive assembly DA, and the description thereof will be omitted. The second drive force transmission device 11B has a structure in which the first drive force transmission device 11A of the first drive assembly DA is inverted to the left and right, and the description thereof will be omitted as appropriate. Hereinafter, the "first drive force transmission device 11A" and the "second drive force transmission device 11B" may be collectively described simply as a "drive force transmission device 11". Hereinafter, the "first motor 17A" and the "second motor 17B" may be collectively described simply as a "motor 17". Hereinafter, the "first rotary shaft 171A" and the "second rotary shaft 171B" may be collectively described simply as a "rotary shaft 171". Hereinafter, the "first motor case 18A" and the "second motor case 18B" may be collectively described simply as a "motor case 18". Hereinafter, the "at least part 80A of the first motor case 18A" and the "at least part 80B of the second motor case 18B" may be collectively described simply as "at least part 80 of the motor case 18". Hereinafter, the "at least part 80 of the motor case 18", the "at least part 80A of the first motor case 18A", and the "at least part 80B of the second motor case 18B" may be described simply as a "particular part 80", a "particular part 80A", and a "particular part 80B", respectively, for convenience's sake.

Figure 4:
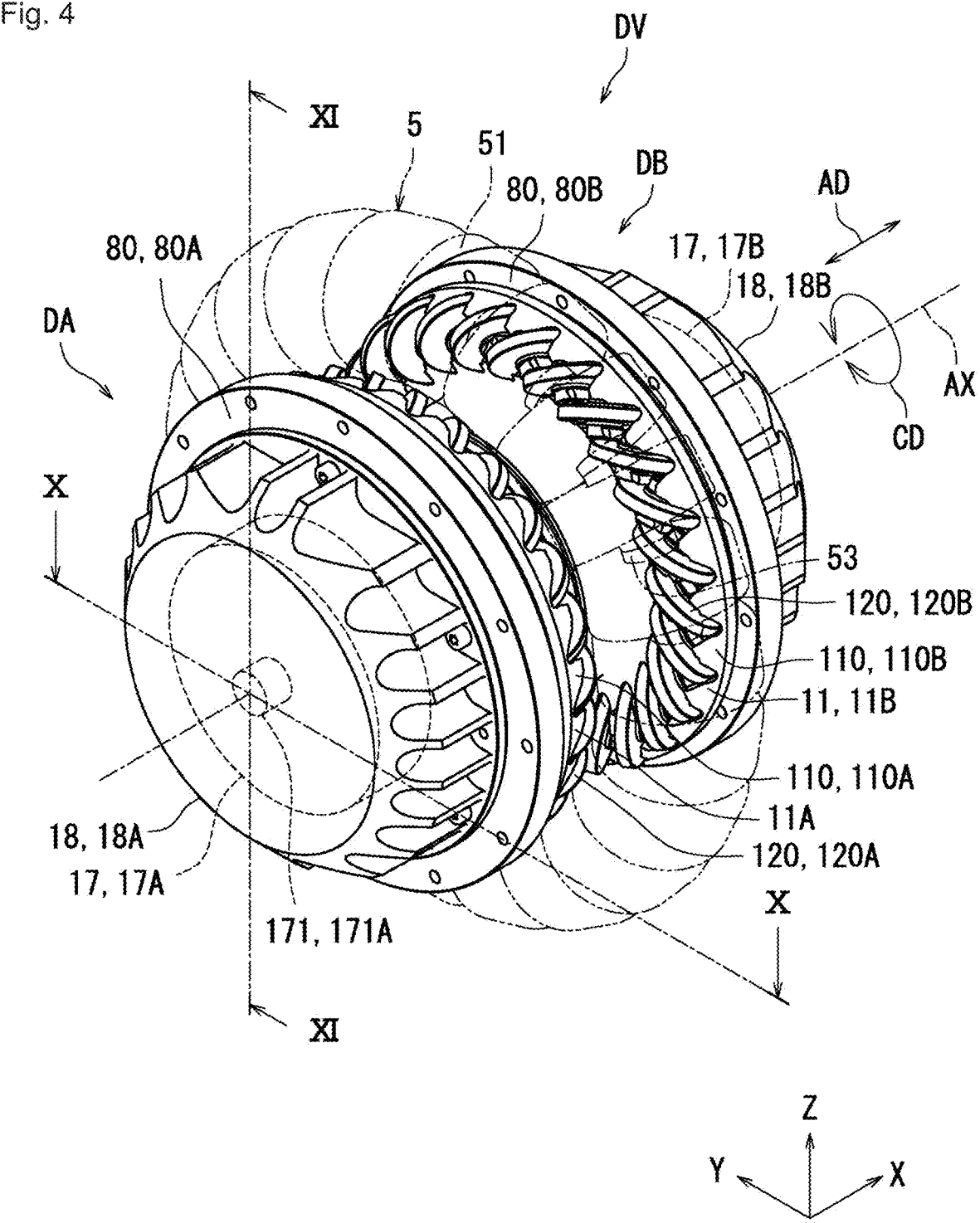
FIG. 4 is a perspective view showing a rotary drive device of a transport vehicle according to an example embodiment of the present disclosure.

Next, the rotary drive device DV will be described with reference to FIG. 4. FIG. 4 is a perspective view showing the rotary drive device DV. As shown in FIG. 4, in the rotary drive device DV, the first drive force transmission device 11A of the first drive assembly DA has a substantially disk-like shape. The first drive force transmission device 11A is arranged on one side of the main wheel 5 in the axial direction AD. The first drive force transmission device 11A is rotatably supported. The first drive force transmission device 11A is driven by the first motor 17A to rotate about the rotation axis AX. Therefore, the rotation axis AX is also the rotation axis of the first drive force transmission device 11A. Then, the first drive force transmission device 11A comes into contact with the main wheel 5 from one side of the main wheel 5 in the axial direction AD to drive the main wheel 5.

The first drive force transmission device 11A rotates about the rotation axis AX. As a result, the first drive force transmission device 11A transmits the drive force based on the rotational force to the main wheel 5. That is, the first drive force transmission device 11A transmits the drive force of the first motor 17A to the main wheel 5.

The second drive force transmission device 11B of the second drive assembly DB has a substantially disk-like shape. The second drive force transmission device 11B is arranged on the other side of the main wheel 5 in the axial direction AD. The second drive force transmission device 11B is rotatably supported by a main shaft 9. The second drive force transmission device 11B is driven by the second motor 17B to rotate about the rotation axis AX. Therefore, the rotation axis AX is also the rotation axis of the second drive force transmission device 11B. Then, the second drive force transmission device 11B comes into contact with the main wheel 5 from the other side of the main wheel 5 in the axial direction AD to drive the main wheel 5.

The first drive force transmission device 11A and the second drive force transmission device 11B hold the main wheel 5 from the axial direction AD. The first drive force transmission device 11A and the second drive force transmission device 11B are arranged symmetrically across the main wheel 5. Furthermore, the first drive force transmission device 11A and the second drive force transmission device 11B rotatably support the main wheel 5 about the rotation axis AX.

The main wheel 5 has a plurality of driven rollers 51 and a core body 53. The core body 53 extends along the circumferential direction CD about the rotation axis AX. The core body 53 has a substantially circular shape. Each of the plurality of driven rollers 51 has a substantially cylindrical shape. The plurality of driven rollers 51 are rotatably supported by the core body 53. Specifically, each of the plurality of driven rollers 51 is rotatable about an axis along a tangential direction of the core body 53 at its own position. Hereinafter, rotation of the driven roller 51 about an axis along the tangential direction of the core body 53 at its own position may be described as "spinning". The plurality of driven rollers 51 are arranged along the circumferential direction CD with respect to the rotation axis AX. More specifically, the plurality of driven rollers 51 are arranged on the core body 53 at intervals along the circumferential direction CD.

When the main wheel 5 rotates about the rotation axis AX, each of the plurality of driven rollers 51 is rotationally moved along the circumferential direction CD. Hereinafter, the position of the driven roller 51 in the circumferential direction CD when the driven roller 51 is rotationally moved along the circumferential direction CD may be described as a "rotational movement position". Each of the plurality of driven rollers 51 comes into contact with the floor surface or the ground surface in accordance with the rotational movement position of the driven roller 51. Hereinafter, the contact of the driven roller 51 with the floor surface or the ground surface may be described as "grounding". A roller body of the driven roller 51 is made of rubber, for example.

Next, the details of the first drive force transmission device 11A will be described with reference to FIGS. 4 and 5. As shown in FIG. 4, the first drive assembly DA has the first drive force transmission 110A. The second drive assembly DB has the second drive force transmission 110B. More specifically, in the present example embodiment, the first drive assembly DA has the first drive force transmission device 11A, and the first drive force transmission device 11A has the first drive force transmission 110A. Similarly, in the present example embodiment, the second drive assembly DB has the second drive force transmission device 11B, and the second drive force transmission device 11B has the second drive force transmission 110B. Hereinafter, the "first drive force transmission 110A" and the "second drive force transmission 110B" may be collectively described simply as a "drive force transmission 110". The drive force transmission 110 has a substantially disk-like shape. The drive force transmission 110 is made of a highly rigid material such as, for example, metal and hard plastic.

The drive force transmission 110 is rotatable about the rotation axis AX. Specifically, when the rotary shaft 171 of the motor 17 rotates, the drive force transmission 110 rotates about the rotation axis AX. Therefore, the rotation axis AX is also the rotation axis of the drive force transmission 110.

Figure 5:
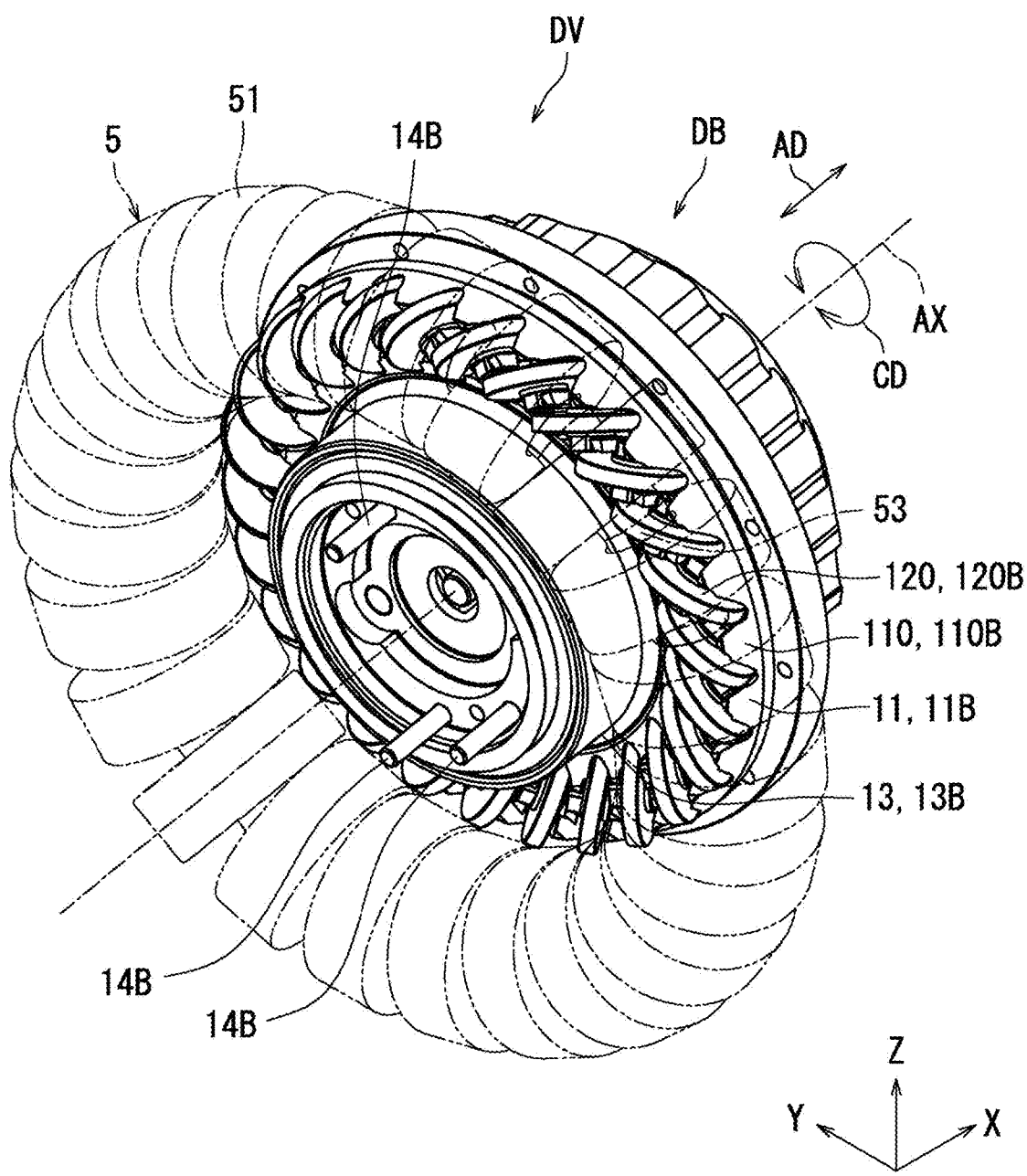
FIG. 5 is a perspective view showing a drive assembly of a rotary drive device according to an example embodiment of the present disclosure.

FIG. 5 is a perspective view showing the main wheel 5 and the second drive assembly DB. In FIG. 5, the main wheel 5 and the second drive assembly DB are viewed from the side where the first drive assembly DA is arranged in FIG. 4. In FIG. 5, the first drive assembly DA is not illustrated for ease of understanding. Furthermore, in FIG. 5, the main wheel 5 is shown by a two-dot chain line in order to make the figure easier to see.

As shown in FIGS. 4 and 5, the first drive assembly DA has a plurality of first driving rollers 120A. The second drive assembly DB has a plurality of second driving rollers 120B. More specifically, in the present example embodiment, the first drive assembly DA has the first drive force transmission device 11A, and the first drive force transmission device 11A has the plurality of first driving rollers 120A. Similarly, in the present example embodiment, the second drive assembly DB has the second drive force transmission device 11B, and the second drive force transmission device 11B has the plurality of second driving rollers 120B. Hereinafter, the "first driving roller 120A" and the "second driving roller 120B" may be collectively described simply as a "driving roller 120". The plurality of driving rollers 120 are arranged in the drive force transmission 110 along the circumferential direction CD. When the drive force transmission 110 rotates about the rotation axis AX, each of the plurality of driving rollers 120 is rotationally moved along the circumferential direction CD. Hereinafter, the position of the driving roller 120 in the circumferential direction CD when the driving roller 120 is rotationally moved along the circumferential direction CD may be described as a "rotational movement position".

The plurality of first driving rollers 120A come into contact with at least part of the plurality of driven rollers 51 from one side of the axial direction AD. The plurality of second driving rollers 120B come into contact with at least part of the plurality of driven rollers 51 from the other side of the axial direction AD. Specifically, each of the plurality of driving rollers 120 comes into contact with any of the plurality of driven rollers 51 in accordance with the rotational movement position of the driving roller 120. At least, the driving roller 120 comes into contact with the driven roller 51 positioned at the lowermost part and grounded. In this case, the outer circumferential surface of the driving roller 120 comes into contact with the outer circumferential surface of the driven roller 51. As a result, by the friction between the driving roller 120 and the driven roller 51, the drive force based on the rotation of the drive force transmission 110 is transmitted from the driving roller 120 to the driven roller 51. In other words, the drive force transmission 110 rotates to transmit the drive force of the motor 17 to the main wheel 5 via the plurality of driving rollers 120. Moreover, in other words, the plurality of driving rollers 120 transmit propulsion force to the main wheel 5.

Specifically, each of the plurality of driving rollers 120 is rotatably arranged around a center axis (hereinafter, described as a "center axis CT") extending in a direction that is neither orthogonal nor parallel to the rotation direction of the main wheel 5 about the rotation axis AX. That is, the center axis CT of the plurality of driving rollers 120 is inclined with respect to the rotation direction of the main wheel 5 about the rotation axis AX, and has a twisting relationship with respect to the rotation axis AX.

At least the part 80A of the first motor case 18A faces at least part of the plurality of first driving rollers 120A in the axial direction AD. In other words, the particular part 80A and at least part of the first driving roller 120A oppose each other so as to overlap each other in the axial direction AD. At least the part 80B of the second motor case 18B faces at least part of the plurality of second driving rollers 120B in the axial direction AD. In other words, the particular part 80B and at least part of the second driving roller 120B oppose each other so as to overlap each other in the axial direction AD.

The second drive assembly DB further has a second carrier 13B, at least one second coupling member 14B, and a second deceleration assembly. In the present example embodiment, the second drive assembly DB has three second coupling members 14B. The second coupling member 14B is, for example, a bolt.

Similarly, the first drive assembly DA further has a first carrier, at least one first coupling member, and a first deceleration assembly. In the present example embodiment, the first drive assembly DA has three first coupling members. Hereinafter, the "first carrier" may be described as a "first carrier 13A" and the "first coupling member" may be described as a "first coupling member 14A". The first deceleration assembly and the second deceleration assembly will be described later with reference to FIG. 10. Hereinafter, the "first carrier 13A" and the "second carrier 13B" may be collectively described simply as a "carrier 13". Hereinafter, the "first coupling member 14A" and the "second coupling member 14B" may be collectively described simply as a "coupling member 14".

The first carrier 13A and the second carrier 13B are coupled via at least one coupling member 14A and at least one coupling member 14B. Therefore, the first drive assembly DA and the second drive assembly DB are coupled via at least one coupling member 14A and at least one coupling member 14B.

Subsequently, the control of the movement direction of the main wheel 5 will be described with reference to FIGS. 4 and 5. As shown in FIG. 4, the first motor 17A and the second motor 17B independently control the rotation direction and the rotation speed of the first drive force transmission 110A and the rotation direction and the rotation speed of the second drive force transmission 110B, thereby controlling the movement direction of the main wheel 5.

Specifically, when the first motor 17A and the second motor 17B are driven in the same rotation direction at the same rotation speed, the first drive force transmission 110A and the second drive force transmission 110B rotate at the same rotation speed in the same rotation direction, and the main wheel 5 rotates about the rotation axis AX. In this case, no difference occurs in rotation speed between the first drive force transmission 110A and the second drive force transmission 110B, and hence the driven roller 51 of the main wheel 5 does not spin, and the main wheel 5 moves forward or backward straight.

On the other hand, when the first motor 17A and the second motor 17B are driven in different rotation directions and/or at different rotation speeds, a difference occurs in rotation speed between the first drive force transmission 110A and the second drive force transmission 110B.

In this case, a component force orthogonal to the circumferential force generated by the rotational force of the first drive force transmission 110A acts on the contact surface between the driving roller 120 (FIG. 5) of the first drive force transmission 110A and the driven roller 51 of the main wheel 5. In addition, a component force orthogonal to the circumferential force generated by the rotational force of the second drive force transmission 110B acts on the contact surface between the driving roller 120 of the second drive force transmission 110B and the driven roller 51 of the main wheel 5.

Therefore, the driven roller 51 spins without the main wheel 5 rotating about the rotation axis AX, or the driven roller 51 spins with the main wheel 5 rotating about the rotation axis AX. As a result, the main wheel 5 moves in the left-right direction or the oblique direction.

The first drive force transmission device 11A and the second drive force transmission device 11B support the main wheel 5 rotatably about the rotation axis AX by holding the main wheel 5 between the plurality of driving rollers 120 of the first drive force transmission 110A and the plurality of driving rollers 120 of the second drive force transmission 110B.

Figure 6A:
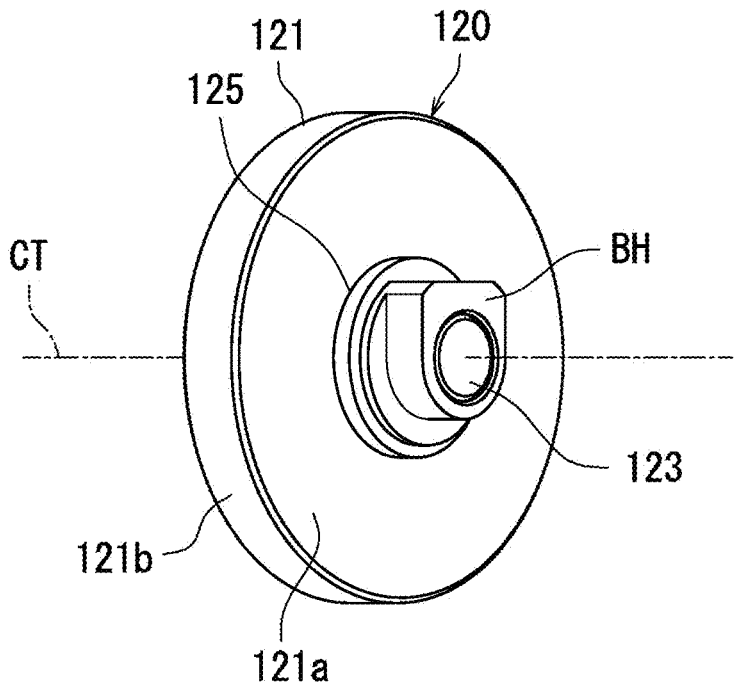
FIG. 6A is a perspective view showing a driving roller of a drive force transmission device according to an example embodiment of the present disclosure.
Figure 6B:
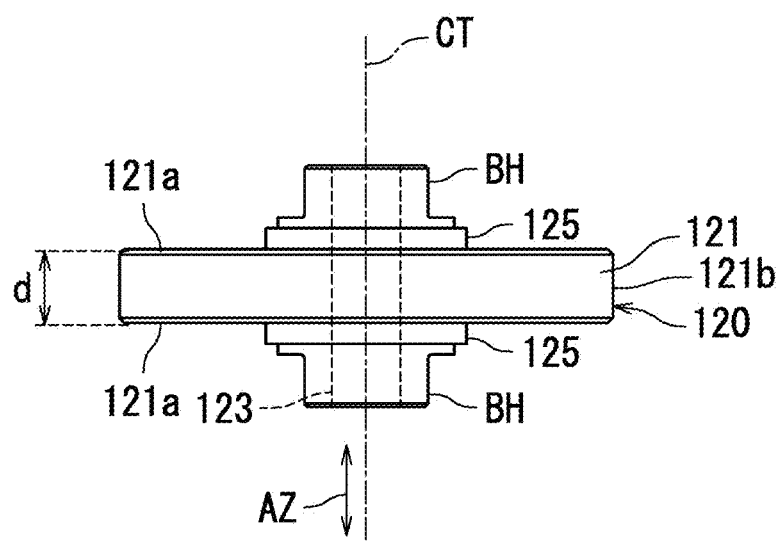
FIG. 6B is a top view showing a driving roller of a drive force transmission device according to an example embodiment of the present disclosure.

Next, the driving roller 120 will be described with reference to FIGS. 6A and 6B. FIG. 6A is a perspective view showing the driving roller 120. FIG. 6B is a top view showing the driving roller 120. As shown in FIGS. 6A and 6B, the driving roller 120 has a roller body 121 and a shaft 123. The roller body 121 has a substantially disk-like shape. The roller body 121 is made of a highly rigid material such as, for example, metal and hard plastic. The shaft 123 is arranged on the center axis CT. That is, the axis 123 extends along the center axis CT. The shaft 123 has a substantially cylindrical shape. The shaft 123 penetrates the roller body 121 and is fixed to the roller body 121. The shaft 123 is made of a highly rigid material such as, for example, metal and hard plastic.

Here, the drive force transmission device 11 (FIG. 5) has, with respect to one driving roller 120, a pair of bushes BH and a pair of shims 125. Since the first drive force transmission device 11A has the plurality of driving rollers 120, the first drive force transmission device 11A has a plurality of bushes BH and a plurality of shims 125.

The pair of bushes BH rotatably support the driving roller 120 about the center axis CT. Specifically, one bush BH of the pair of bushes BH rotatably supports one end portion of the shaft 123, and the other bush BH rotatably supports the other end portion of the shaft 123. The bush BH is made of a highly rigid material such as, for example, metal and hard plastic.

Each of the pair of shims 125 is made of an elastic member such as rubber. Then, one shim 125 of the pair of shims 125 is held between one side surface 121a of the roller body 121 and the bush BH, and the other shim 125 is held between the other side surface 121a of the roller body 121 and the bush BH. As a result, it is possible to suppress generation of sound caused by the driving roller 120 when the drive force transmission 110 rotates about the rotation axis AX.

Figure 7A:
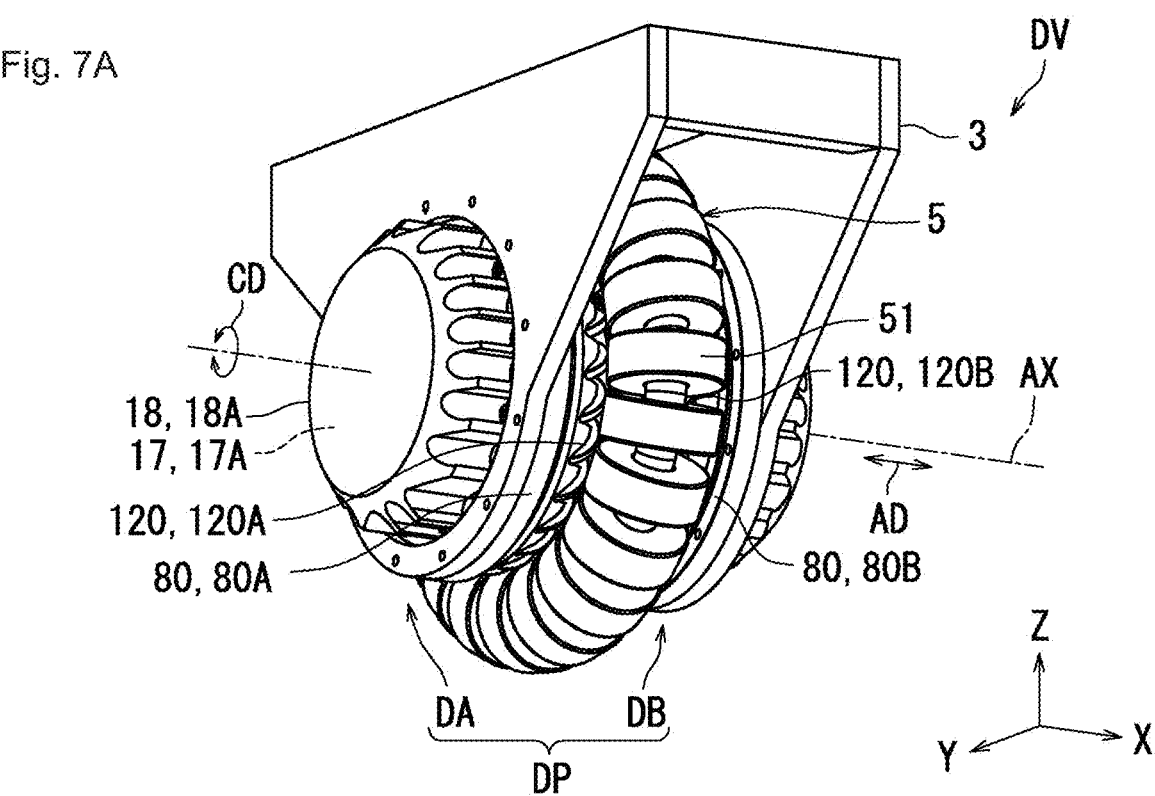
FIG. 7A is a perspective view showing the rotary drive device and a portion of a vehicle body of a transport vehicle according to an example embodiment of the present disclosure.
Figure 7B:
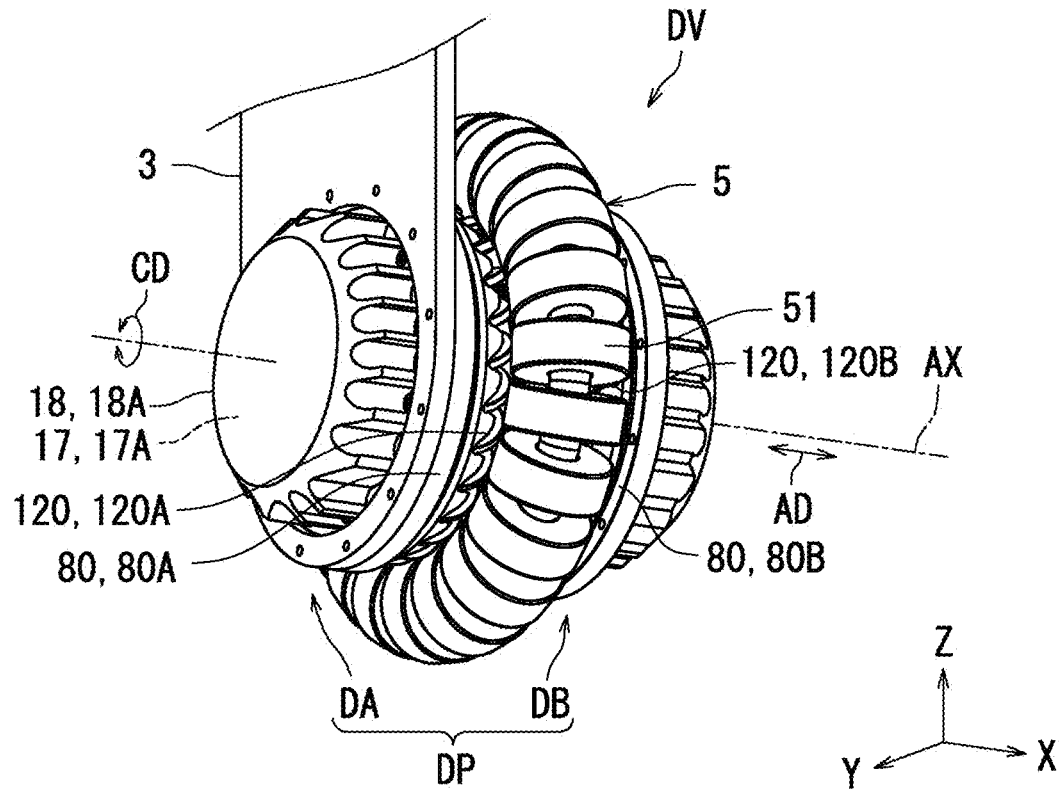
FIG. 7B is a perspective view showing a rotary drive device and a portion of a vehicle body of a transport vehicle according to an example embodiment of the present disclosure.

Next, attachment of the rotary drive device DV to the vehicle body 3 of the transport vehicle 1 will be described with reference to FIGS. 3, 7A, and 7B. FIGS. 7A and 7B are perspective views showing the rotary drive device DV and a part of the vehicle body 3 of the transport vehicle 1. As shown in FIG. 7A, for example, each of the particular part 80A and the particular part 80B is attachable to the vehicle body 3. That is, both the particular part 80A and the particular part 80B are attachable to the vehicle body 3.

The vehicle body 3 may be, for example, a housing of the transport vehicle 1 or a coupling member. The coupling member is a member coupling the particular part 80 with the housing of the transport vehicle 1. In other words, the vehicle body 3 may include all of the components of the transport vehicle 1 except the rotary drive device DV. The vehicle body 3 has a contact surface with respect to the particular part 80.

The particular part 80 only needs to be attachable to the vehicle body 3 at a height at which the driven roller 51 can be grounded, and, for example, may be attachable to the bottom portion 3a below the vehicle body 3 or may be attachable to the side of the vehicle body 3. The particular part 80 is fixed by, for example, a bolt not illustrated in contact with the contact surface of the vehicle body 3.

As described above, according to the present example embodiment, it is preferable that both the particular part 80A and the particular part 80B are attachable to the vehicle body 3, and that the particular part 80A and the particular part 80B are arranged facing at least part of the plurality of first driving rollers 120A and at least part of the plurality of second driving rollers 120B, respectively, in the axial direction AD. This is because, even in a configuration in which the motor 17 is arranged at a position where the motor 17 overlaps the rotation axis AX in the axial direction AD, the expansion of the attachment space along the axial direction AD can be reduced while arranging the first drive assembly DA and the second drive assembly DB at highly accurate facing positions.

Furthermore, according to the present example embodiment, the rotary drive device DV only needs to be attachable to the vehicle body 3, and for example, at least one of the particular part 80A and the particular part 80B only needs to be attachable to the vehicle body 3. Furthermore, as the pair of drive assemblies DP, the second drive assembly DB preferably has a configuration similar to that of the first drive assembly DA. This is because the coaxiality between the first drive assembly DA and the second drive assembly DB is improved. Accordingly, the stability of the transport vehicle 1 during traveling can be improved.

As shown in FIG. 7B, according to the present example embodiment, only one of the pair of drive assemblies DP may be attachable to the vehicle body 3. For example, in the pair of drive assemblies DP, only the particular part 80A may be attachable to the vehicle body 3. In the axial direction AD, the particular part 80A is arranged facing at least part of the plurality of first driving rollers 120A, whereby the extension of the attachment space along the axial direction AD can be reduced. Therefore, it is possible to reduce the space required for attachment to the vehicle body 3. That is, space saving can be promoted.

Figure 8A:
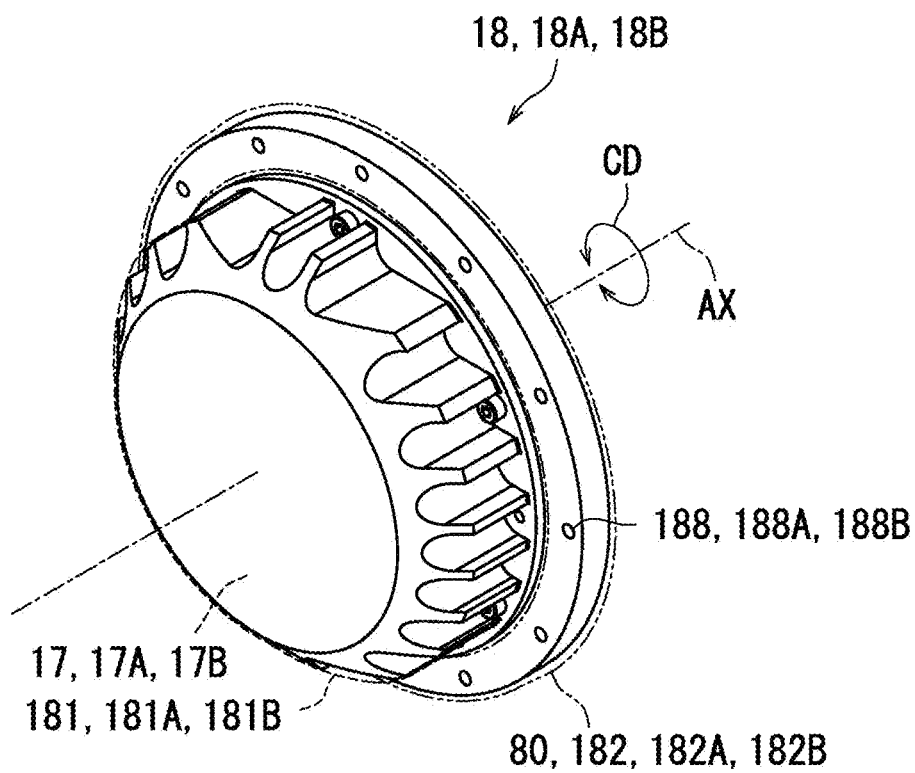
FIG. 8A is a perspective view showing a motor case of a rotary drive device according to an example embodiment of the present disclosure.
Figure 8B:
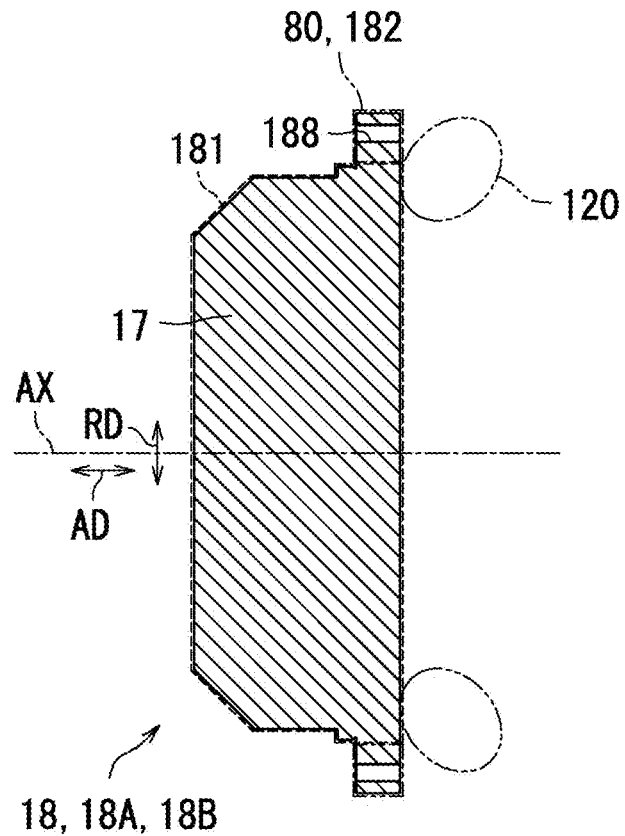
FIG. 8B is a cross-sectional view showing a motor case of a rotary drive device according to an example embodiment of the present disclosure.

Next, the configuration of the motor case 18 will be described in detail with reference to FIGS. 8A and 8B. FIG. 8A is a perspective view showing the motor case 18. FIG. 8B is a cross-sectional view showing the motor case 18. In FIG. 8B, for easier understanding of the outer shape of the motor case 18, the illustration of the motor 17 is simplified and hatched.

As shown in FIGS. 8A and 8B, the first motor case 18A preferably has a first body portion 181A and a first flange portion 182A. Similarly, the second motor case 18B preferably has a second body portion 181B and a second flange portion 182B. Hereinafter, the "first body portion 181A" and the "second body portion 181B" may be collectively described simply as a "body portion 181". The "first flange portion 182A" and the "second flange portion 182B" may be collectively described simply as a "flange portion 182". The body portion 181 has a substantially bottomed cylindrical shape extending along the rotation axis AX. The body portion 181 accommodates the motor 17. The flange portion 182 projects from the body portion 181 toward the outside in the radial direction RD with respect to the rotation axis AX. The particular part 80 constitutes the flange portion 182. According to the present example embodiment, the particular part 80 may be arranged avoiding the motor 17 in the radial direction RD. Therefore, in the pair of drive assemblies DP, the rotary drive device DV can be effectively attached to the vehicle body 3 without extending along the axial direction AD the attachment position of the rotary drive device DV to the vehicle body 3. Furthermore, it is possible to reduce a foreign matter from the outside from hitting or entering the driving roller 120.

The first flange portion 182A preferably has a plurality of first attachment holes 188A. Similarly, the second flange portion 182B preferably has a plurality of second attachment holes 188B. Hereinafter, the "first attachment hole 188A" and the "second attachment hole 188B" may be collectively described simply as an "attachment hole 188". The plurality of attachment holes 188 are arranged on the flange portion 182, for example, at equal intervals along the circumferential direction CD. The attachment hole 188 is, for example, a through hole or a screw hole extending along the rotation axis AX. The vehicle body 3 is attachable to the attachment hole 188 with bolts. Therefore, it is possible to easily fix the flange portion 182 to the vehicle body 3. Note that the number of attachment holes 188 may be one.

Figure 9:
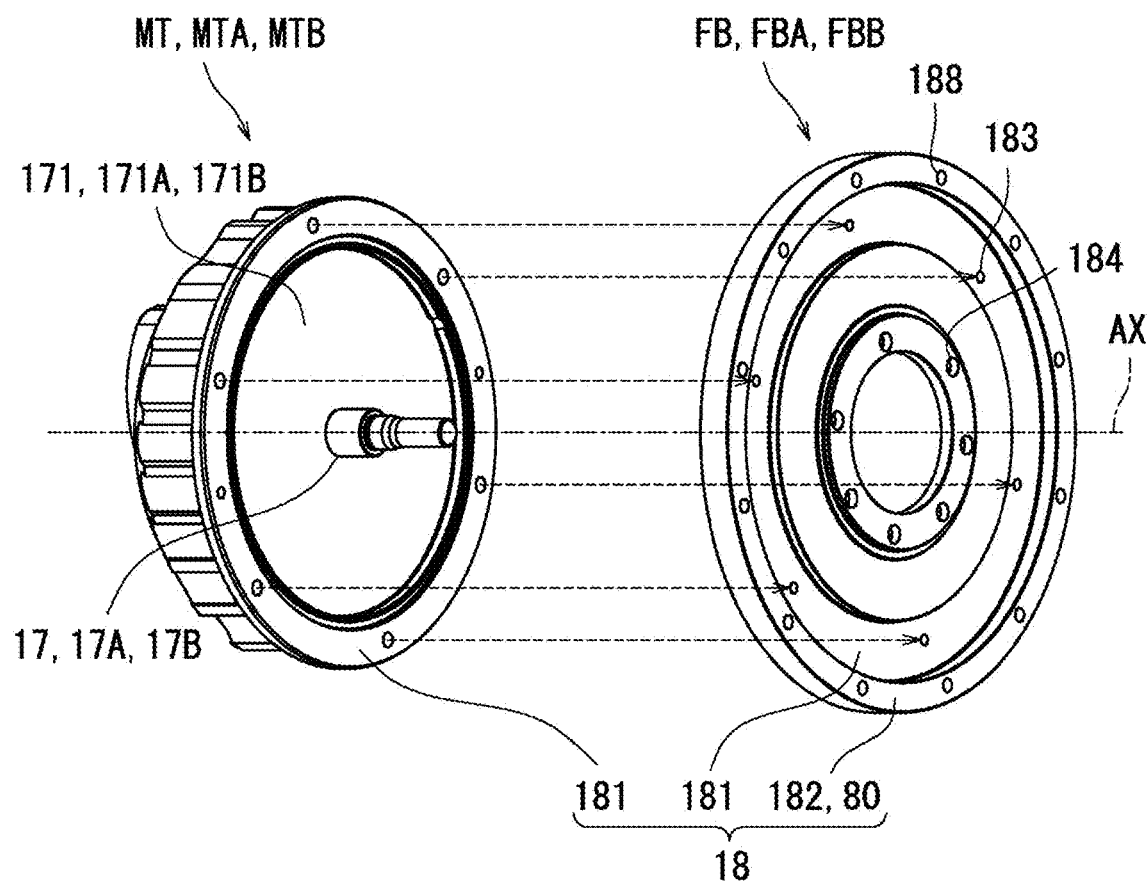
FIG. 9 is an exploded perspective view showing a motor unit and a front bracket of a rotary drive device according to an example embodiment of the present disclosure.

Next, an example of the particular part 80 will be described with reference to FIG. 9. The particular part 80A and the particular part 80B are preferably a first front bracket FBA and a second front bracket FBB, respectively. Hereinafter, the "first front bracket FBA" and the "second front bracket FBB" may be collectively described simply as a "front bracket FB". A "part of the first motor case 18A and the first motor 17A excluding the first front bracket FBA" and a "part of the second motor case 18B and the second motor 17B excluding the second front bracket FBB" may be described as a "first motor unit MTA" and a "second motor unit MTB", respectively. Furthermore, the "first motor unit MTA" and the "second motor unit MTB" may be collectively described simply as a "motor unit MT". FIG. 9 is an exploded perspective view showing the motor unit MT and the front bracket FB. Note that a "part of the motor unit MT excluding the motor 17" and a "part of the front bracket FB excluding the flange portion 182" constitute the body portion 181.

As shown in FIG. 9, the front bracket FB is a substantially annular member such as circular. The front bracket FB is made of, for example, metal or resin. The front bracket FB substantially closes the opening of the motor unit MT. The front bracket FB has a plurality of holes 183 and a plurality of holes 184. The particular part 80 constitutes an end portion outside in the radial direction RD of the front bracket FB with respect to the rotation axis AX. In other words, the particular part 80 constitutes the flange portion 182.

Figure 10:
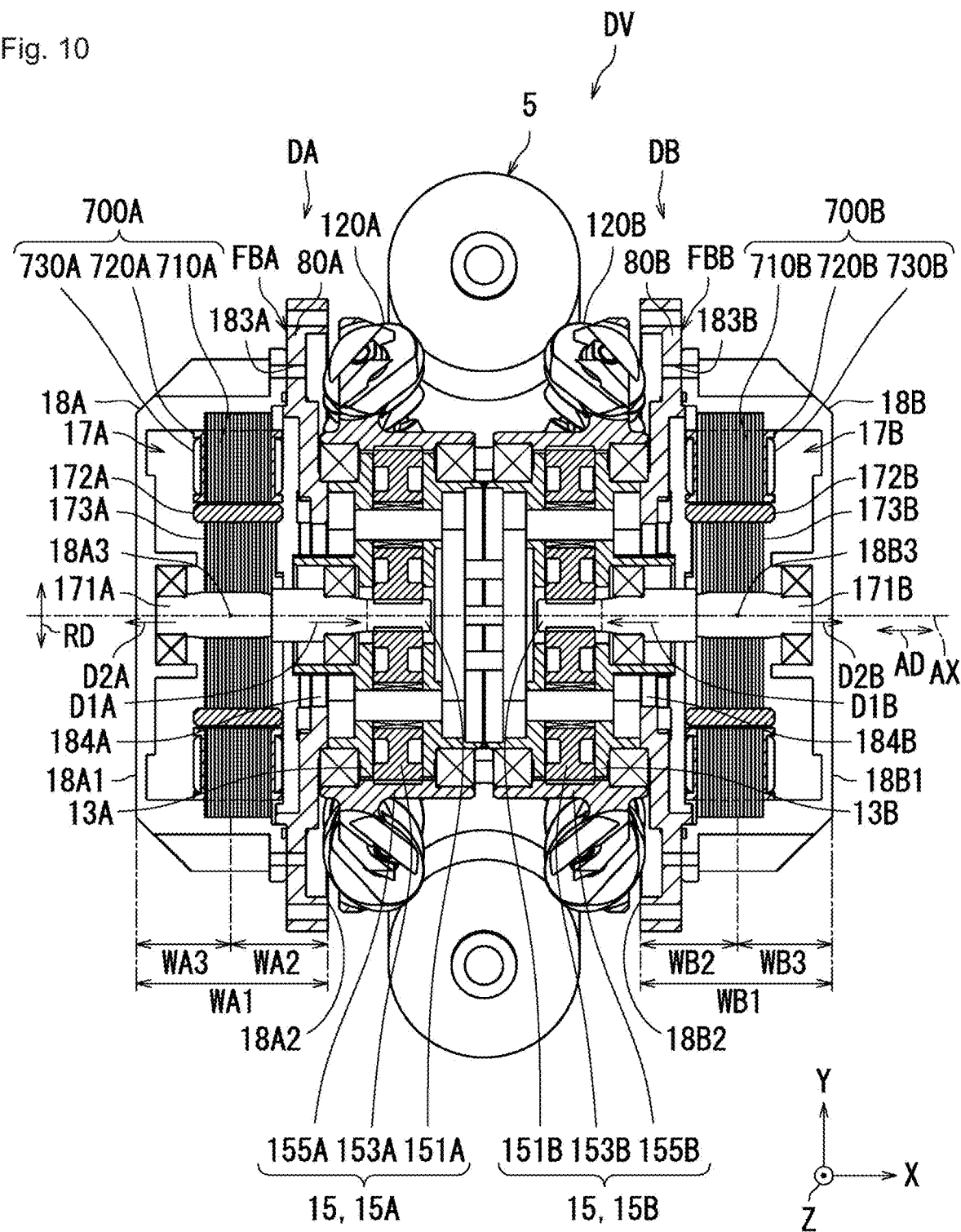
FIG. 10 is a cross-sectional view taken along a line X-X of FIG. 4.
Figure 11:
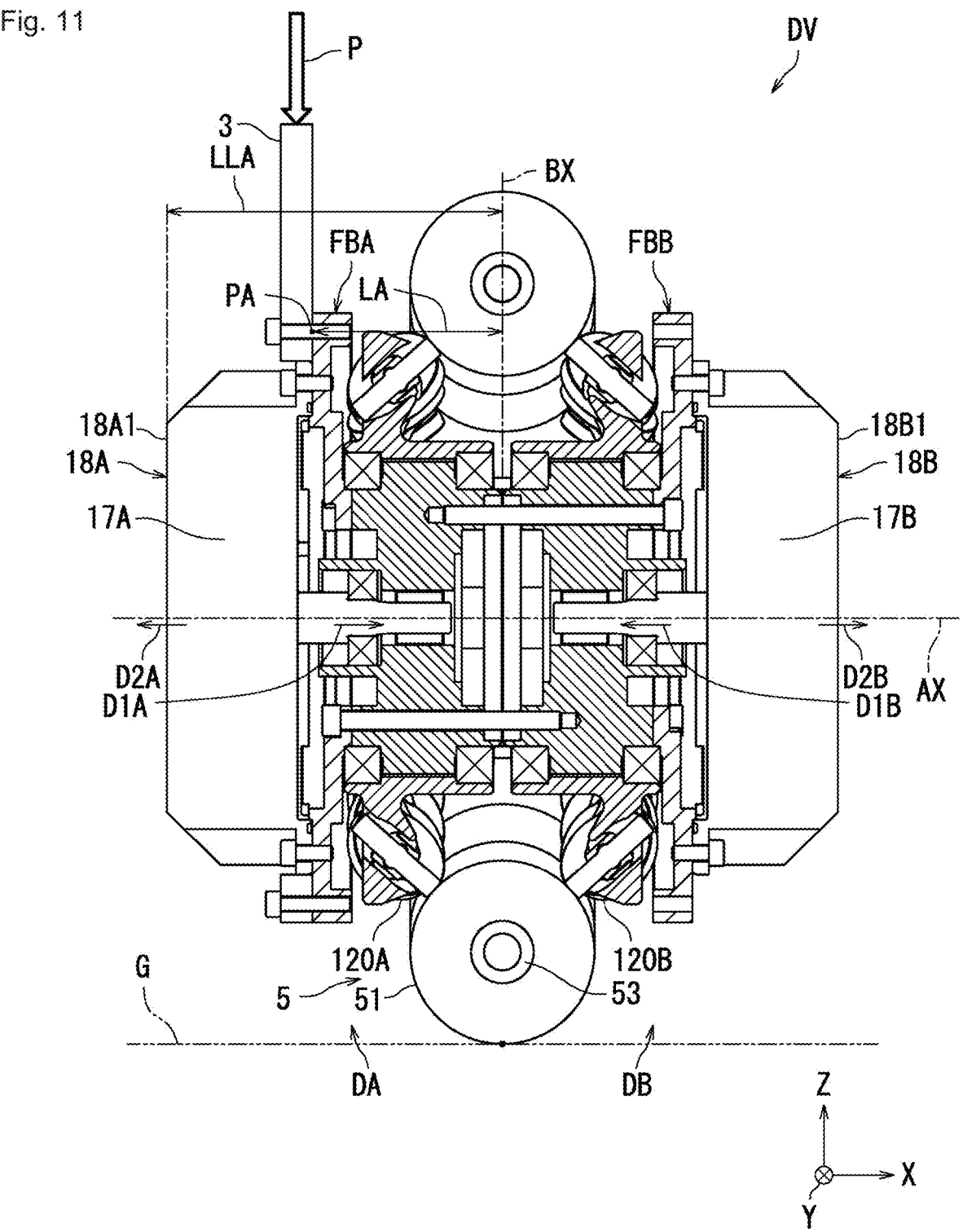
FIG. 11 is a cross-sectional view taken along a line XI-XI of FIG. 4.

Next, the details of a first deceleration assembly 15A, a second deceleration assembly 15B, the front bracket FB, and the motor 17 will be described with reference to FIG. 9, and further with reference to FIGS. 10 and 11. FIG. 10 is a cross-sectional view taken along the line X-X of FIG. 4. FIG. 11 is a cross-sectional view taken along the line XI-XI of FIG. 4. As shown in FIG. 10, the first drive assembly DA and the second drive assembly DB further have the first deceleration assembly 15A and the second deceleration assembly 15B, respectively. Hereinafter, the "first deceleration assembly 15A" and the "second deceleration assembly 15B" may be collectively described simply as a "deceleration assembly 15".

The first deceleration assembly 15A is arranged on a load side D1A in the axial direction AD with respect to the first motor case 18A. More specifically, the load side D1A indicates the side of the first motor 17A on which the load is connected. In the first motor 17A, the side opposite to the load side D1A is an anti-load side D2A. In FIG. 10, the load side D1A and the anti-load side D2A with respect to the first motor 17A are on the right direction side and the left direction side, respectively.

Similar to the first deceleration assembly 15A, the second deceleration assembly 15B is arranged on a load side D1B in the axial direction AD with respect to the second motor case 18B. More specifically, the load side D1B indicates the side of the second motor 17B on which the load is connected. In the second motor 17B, the side opposite to the load side D1B is an anti-load side D2B. In FIG. 10, the load side D1B and the anti-load side D2B with respect to the second motor 17B are on the left direction side and the right direction side, respectively.

The front bracket FB couples the motor unit MT and the deceleration assembly 15. More specifically, the front bracket FB is connected with the motor unit MT. The motor unit MT is fixed to the plurality of holes 183 of the front bracket FB with bolts. The front bracket FB is connected with the deceleration assembly 15. The deceleration assembly 15 is fixed to the plurality of holes 184 of the front bracket FB. According to the present example embodiment, since the particular part 80 is the front bracket FB, it is possible to suppress an increase in the number of components for attaching the rotary drive device DV to the vehicle body 3, and it is possible to suppress an expansion of the attachment position in the axial direction AD. Furthermore, the thickness of the motor unit MT in the axial direction AD can be reduced.

The first deceleration assembly 15A has a first sun gear 151A, a plurality of first planetary gears 153A, a first internal gear 155A, and a plurality of bearings. The second deceleration assembly 15B has a second sun gear 151B, a plurality of second planetary gears 153B, a second internal gear 155B, and a plurality of bearings. Hereinafter, the "first sun gear 151A" and the "second sun gear 151B" may be collectively described simply as a "sun gear 151". Hereinafter, the "first planetary gear 153A" and the "second planetary gear 153B" may be collectively described simply as a "planetary gear 153". Hereinafter, the "first internal gear 155A" and the "second internal gear 155B" may be collectively described simply as an "internal gear 155".

The deceleration assembly 15 converts a rotation motion of a rotation number N1 into a rotation motion of a rotation number N2 lower than the rotation number N1. The rotation number N1 and the rotation number N2 indicate the rotation speed of the rotation motion per unit time. In the present example embodiment, the deceleration assembly 15 decelerates the rotation speed of the rotary shaft 171 and rotates the drive force transmission 110 at the decelerated rotation speed.

The deceleration assembly 15 transmits power by rotating the sun gear 151 and the plurality of planetary gears 153 in contact with each other. That is, the deceleration assembly 15 is a so-called planetary gear type decelerator. More specifically, the deceleration assembly 15 is a star type planetary gear type decelerator. Specifically, external teeth of each of the plurality of planetary gears 153 mesh with internal teeth of the internal gear 155. The internal gear 155 constitutes a part of the drive force transmission 110. Therefore, when the plurality of planetary gears 153 rotate, the drive force transmission 110 rotates.

The carrier 13 accommodates at least part of the deceleration assembly 15. In the present example embodiment, the carrier 13 accommodates a part of the rotary shaft 171, the sun gear 151, and the plurality of planetary gears 153.

The first motor 17A has the first rotary shaft 171A, a first magnet 172A, a first rotor yoke 173A, and a first stator 700A. The first stator 700A has a first stator core 710A, a plurality of first insulators 720A, and a plurality of first coils 730A. The second motor 17B has the second rotary shaft 171B, a second magnet 172B, a second rotor yoke 173B, and a second stator 700B. The second stator 700B has a second stator core 710B, a plurality of second insulators 720B, and a plurality of second coils 730B.

Hereinafter, the "first magnet 172A" and the "second magnet 172B" may be collectively described simply as a "magnet 172". Hereinafter, the "first rotor yoke 173A" and the "second rotor yoke 173B" may be collectively described simply as a "rotor yoke 173". Hereinafter, the "first stator 700A" and the "second stator 700B" may be collectively described simply as a "stator 700". Hereinafter, the "first stator core 710A" and the "second stator core 710B" may be collectively described simply as a "stator core 710". Hereinafter, the "first insulator 720A" and the "second insulator 720B" may be collectively described simply as an "insulator 720". Hereinafter, the "first coil 730A" and the "second coil 730B" may be collectively described simply as a "coil 730".

The motor 17 is, for example, an inner rotor type motor. The rotary shaft 171, the magnet 172, and the rotor yoke 173 rotate about the rotation axis AX. The magnet 172 is, for example, a permanent magnet. The magnet 172 is fixed on the outer surface of the rotor yoke 173 in the radial direction RD. Therefore, the motor 17 is a so-called surface permanent magnet (SPM) motor. The rotary shaft 171 is arranged about the center axis. More specifically, the rotary shaft 171 is arranged on the rotation axis AX and extends along the axial direction AD. Hereinafter, the rotation axis AX may be described as a "center axis AX" of the motor 17. The rotary shaft 171 is substantially columnar. The "columnar" is, for example, "cylindrical". When the motor 17 is driven, the rotary shaft 171 rotates about the center axis AX at the rotation number N1. The rotary shaft 171 is fixed to the rotor yoke 173. Therefore, the rotary shaft 171 rotates about the center axis AX together with the rotor yoke 173 and the magnet 172.

The stator 700 faces the magnet 172 in the radial direction RD. The stator 700 is arranged about the center axis AX.

The stator core 710 is substantially annular about the center axis AX. The "annular" is, for example, "circular". Each of the insulators 720 is attached to at least part of the stator core 710. Each of the insulators 720 is arranged between the coil 730 and the stator core 710. Accordingly, each of the coils 730 is attached to the stator core 710 via the insulator 720. The insulator 720 is made of an insulating material. Accordingly, each of the insulators 720 electrically insulates the stator core 710 from the coil 730. The stator core 710 is made of, for example, a laminated steel plate in which electromagnetic steel plates are laminated in the axial direction AD. The particular part 80 is arranged outside in the radial direction RD with respect to the rotary shaft 171 relative to the stator core 710, for example. The front bracket FB is arranged between the stator 700 and the deceleration assembly 15 in the axial direction AD, for example.

Furthermore, the particular part 80A is preferably positioned on the load side D1A in the axial direction AD relative to a center part 18A3 between an end surface 18A1 of the anti-load side D2A and an end surface 18A2 of the load side D1A of the first motor case 18A. Specifically, an interval WA2 between the end surface 18A2 and the center part 18A3 is equal to an interval WA3 between the end surface 18A1 and the center part 18A3. Of an interval WA1 between the end surface 18A1 and the end surface 18A2, the particular part 80A is positioned at the interval WA2. In addition, the particular part 80B is preferably positioned on the load side D1B in the axial direction AD relative to a center part 18B3 between an end surface 18B1 of the anti-load side D2B and an end surface 18B2 of the load side D1B of the second motor case 18B. Specifically, an interval WB2 between the end surface 18B2 and the center part 18B3 is equal to an interval WB3 between the end surface 18B1 and the center part 18B3. Of an interval WB1 between the end surface 18B1 and the end surface 18B2, the particular part 80B is positioned at the interval WB2. According to these preferable examples, it is possible to attach the vehicle body 3 on the load sides D1A and D1B relative to the rotary drive device DV. Therefore, the space required for attaching the rotary drive device DV to the vehicle body 3 can be further reduced in the axial direction AD. In particular, as shown in FIG. 7B, when the vehicle body 3 is attached only to one side of the rotary drive device DV, i.e., when the vehicle body 3 is attached only to the particular part 80A or only to the particular part 80B, the moment load that tends to occur can be reduced.

FIG. 11 shows, as an example, the rotary drive device DV in a case where the vehicle body 3 is attached only to the particular part 80A. Specifically, as shown in FIG. 11, when a load P is applied to the vehicle body 3 in a state where the rotary drive device DV is placed on a travel surface G, the load is applied to the main wheel 5. Depending on the stress caused by the load, a moment load is generated at a load point PA at the particular part 80A. The travel surface G is, for example, a floor surface or a ground surface. In general, as the distance from a center line BX of the rotary drive device DV to the load point increases, the moment load applied to the load point tends to increase. For example, when the particular part 80A is positioned on the load side D1A in the axial direction AD relative to the center part 18A3 between the end surface 18A1 of the anti-load side D2A and the end surface 18A2 of the load side D1A of the first motor case 18A, a distance LA from the particular part 80A to the center line BX is smaller than a distance LLA from the end surface 18A1 to the center line BX. Therefore, the moment load when the vehicle body 3 is attached to the particular part 80A or the particular part 80B is smaller than the moment load when the vehicle body 3 is attached to the end surface 18A1 or the end surface 18B1, for example. In other words, the more the position of the particular part 80 is arranged on the load side D1A or the load side D1B relative to the motor 17 in the axial direction AD, the more the moment load generated when the vehicle body 3 is attached to the particular part 80 can be reduced. As a result, the rigidity required for the members such as the vehicle body 3 and the particular part 80 can be reduced.

Figure 12:
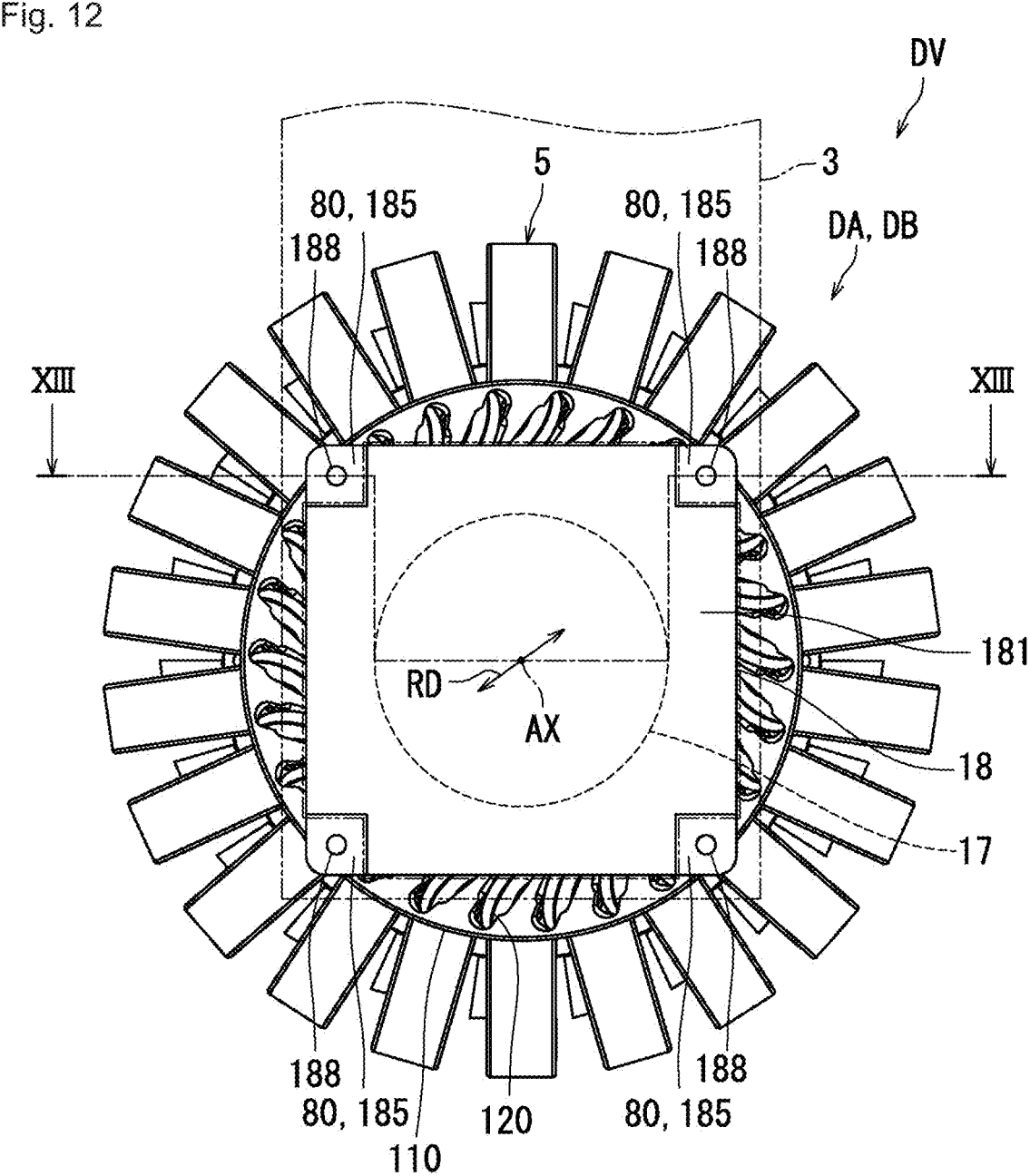
FIG. 12 is a side view showing a rotary drive device according to a variation of an example embodiment of the present disclosure.
Figure 13:
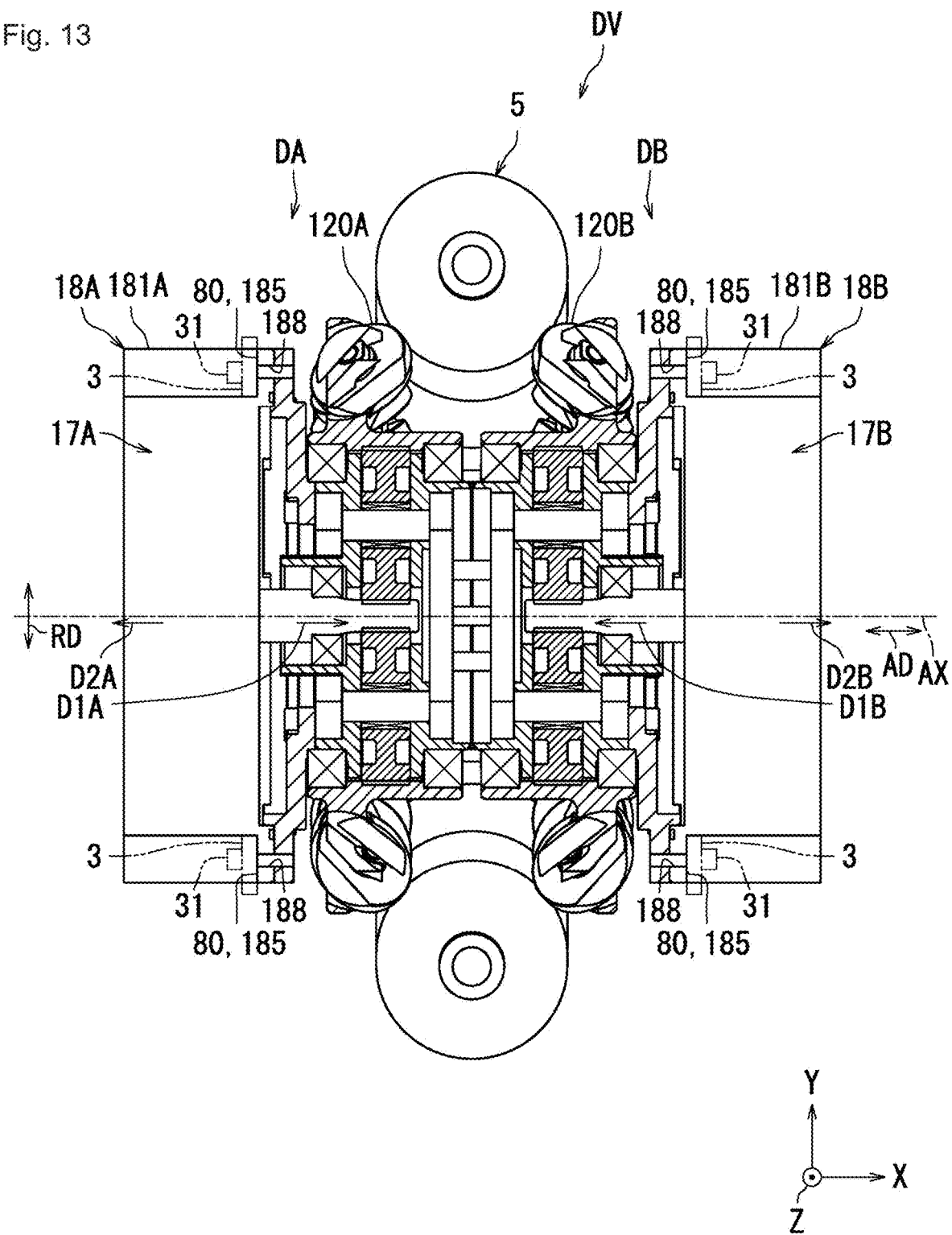
FIG. 13 is a cross-sectional view taken along a line XIII-XIII of FIG. 12.

Next, a variation of the motor case 18 will be described with reference to FIGS. 12 and 13. FIG. 12 is a side view showing the rotary drive device DV according to the variation of the present example embodiment. FIG. 13 is a cross-sectional view taken along the line XIII-XIII of FIG. 12. As shown in FIGS. 12 and 13, the motor case 18 has a cylindrical shape extending along the axial direction AD. In the present variation, the motor case 18 further has a recessed region 185. More specifically, in the present example embodiment, the motor case 18 has the body portion 181, and the body portion 181 has the recessed region 185. In the present variation, the motor case 18 may or may not have the flange portion 182. The recessed region 185 indicates a region recessed toward the inside of the radial direction RD with respect to the rotation axis AX.

The particular part 80 overlaps the recessed region 185 along the axial direction AD. The particular part 80 has, for example, a rectangular plate shape and extends along the radial direction RD. The number of particular parts 80 is preferably plural, e.g., 4, but may be 1. The attachment hole 188 is arranged in the particular part 80. The vehicle body 3 is attached to the particular part 80 using a bolt 31, for example. By arranging the particular part 80 so as to overlap the recessed region 185, the rotary drive device DV can be attached to the vehicle body 3 while further preventing the width in the radial direction RD of the motor case 18 with respect to the rotation axis AX from being expanded. Therefore, the space required for attachment to the vehicle body 3 can be further reduced.

Figure 14:
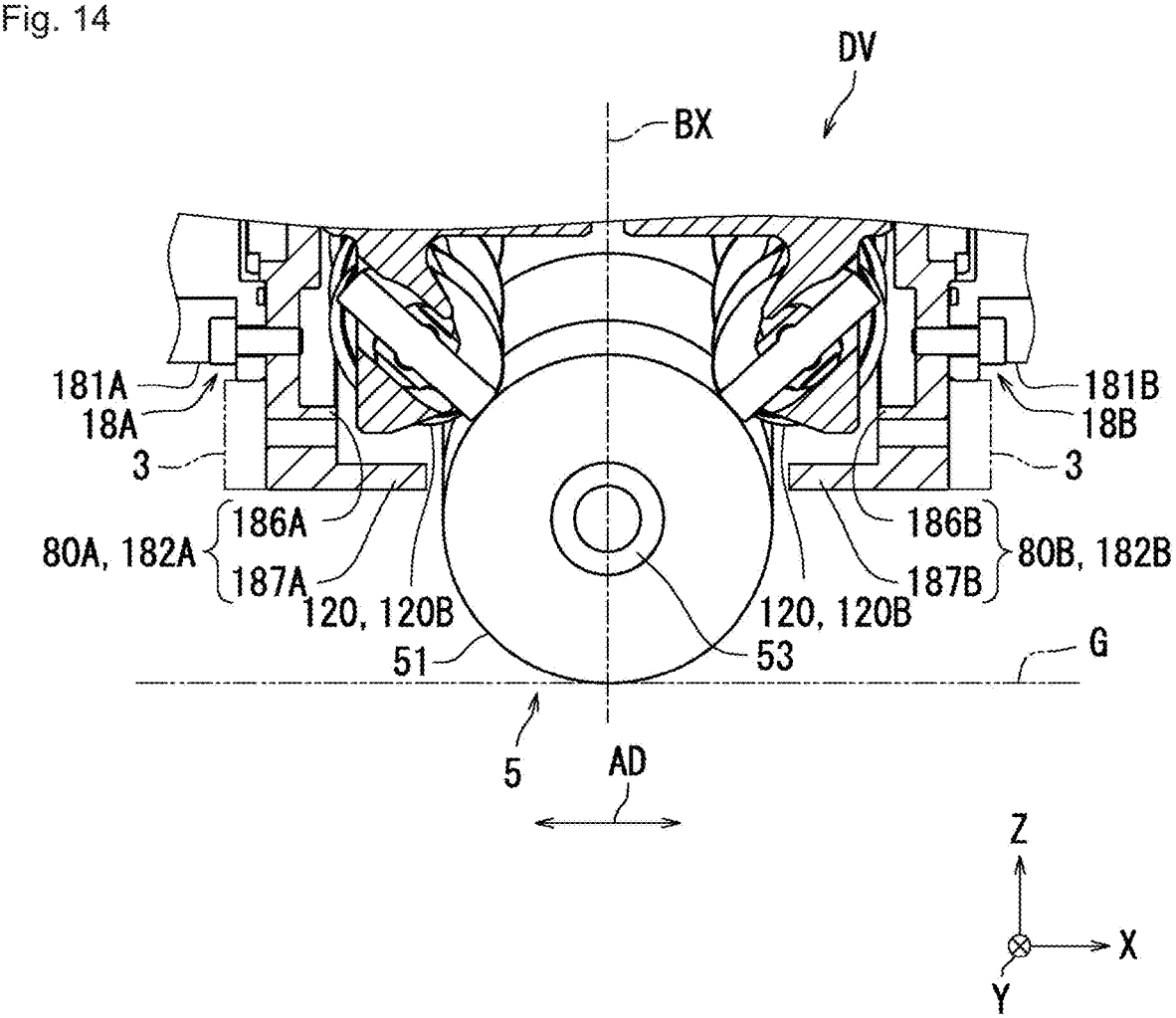
FIG. 14 is a cross-sectional view showing a rotary drive device according to a variation of an example embodiment of the present disclosure.

Next, a further variation of the motor case 18 will be described with reference to FIG. 14. FIG. 14 is a cross-sectional view showing the rotary drive device DV according to the variation of the present example embodiment. In order to make the drawing easier to see, FIG. 14 partially shows the rotary drive device DV.

As shown in FIG. 14, the first flange portion 182A further has a first attachment portion 186A and a first cover portion 187A. The second flange portion 182B further has a second attachment portion 186B and a second cover portion 187B. Hereinafter, the "first attachment portion 186A" and the "second attachment portion 186B" may be collectively described simply as an "attachment portion 186". The "first cover portion 187A" and the "second cover portion 187B" may be collectively described simply as a "cover portion 187".

The attachment portion 186 extends from the body portion 181 toward the outside in the radial direction RD. The attachment portion 186 is attachable to the vehicle body 3. In other words, the particular part 80 constitutes the attachment portion 186. The cover portion 187 is arranged outside the radial direction RD of the driving roller 120 with respect to the rotation axis AX. The cover portion 187 extends from the attachment portion 186 toward the driven roller 51. The cover portion 187 and the attachment portion 186 may be members independent of each other or may be parts of a single member. The cover portion 187 is an annular shape such as a cylindrical shape. The cover portion 187 is not limited to an annular shape, and may partially extend from an end portion outside the radial direction RD of the attachment portion 186 toward the driven roller 51. The cover portion 187 extends along the axial direction AD, for example. The cover portion 187 may extend inclined outside the radial direction RD with respect to the axial direction AD, for example. Since the cover portion 187 extends from the attachment portion 186 toward the driven roller 51, it is possible to further reduce a foreign matter from the outside from hitting or entering the driving roller 120.

Furthermore, the cover portion 187 is preferably arranged vertically below the driving roller 120. That is, when the cover portion 187 partially extends from an end portion of outside in the radial direction RD of the attachment portion 186 toward the driven roller 51, it is effective that the cover portion is arranged vertically below the driving roller 120 in particular. This is because it is possible to effectively reduce a foreign matter splashed up from the travel surface G side of the rotary drive device DV from hitting or entering the driving roller 120.

The example embodiment of the present disclosure has been described with reference to the drawings. However, the present disclosure is not limited to the above-described example embodiment, and the present disclosure can be implemented in various modes without departing from the scope thereof. Various disclosure can be formed by appropriately combining a plurality of components of a plurality of example embodiments. For example, some components may be removed from all components shown in the example embodiments. Furthermore, components across different example embodiments may be combined as appropriate. The drawings mainly schematically show each component for the sake of easy understanding, and the thickness, length, number, interval, and the like of each illustrated component are different from the actual ones for convenience of drawing creation. The speed, material, shape, dimensions, and the like of each component shown in the above example embodiment are only examples and are not particularly limited, and various changes can be made without substantially departing from the configuration of the present disclosure.

(1) In the present example embodiment having been described with reference to FIGS. 1 to 14, the rotary drive device DV (FIG. 3) is applied to the transport vehicle 1. However, the application of the rotary drive device DV is not limited to the transport vehicle 1, and the rotary drive device DV can be applied to any mobile body moving on the floor surface or the ground surface. The mobile body is, for example, a unicycle, a two-wheeler, a three-wheeler, or a four-wheeler. The mobile body may have one rotary drive device DV or two or more rotary drive devices DV.

(2) In the present example embodiment having been described with reference to FIGS. 1 to 14, the rotation axis AX of the main wheel 5 and the rotation axis AX of the motor 17 substantially coincide with each other. However, the rotation axis AX of the motor 17 may be eccentric with respect to the rotation axis of the main wheel 5.

The present disclosure can be used, for example, in a rotary drive device.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A rotary drive device provided on a mobile body, the rotary drive device comprising:
   a main wheel rotatable about a rotation axis; and
   a pair of drive assemblies opposing each other in an axial direction along the rotation axis, each of the pair of drive assemblies drives the main wheel; wherein
   the main wheel includes a plurality of driven rollers along a circumferential direction relative to the rotation axis;
   a first drive assembly, which is one of the pair of drive assemblies, includes:
   a first motor;
   a first motor case accommodating the first motor;
   a first drive force transmission rotating about the rotation axis; and
   a plurality of first driving rollers in the first drive force transmission along the circumferential direction and contacting at least a portion of the plurality of driven rollers from one side of the rotary drive device in the axial direction;
   the first drive force transmission rotates to transmit drive force of the first motor to the main wheel via the plurality of first driving rollers;
   at least a portion of the first motor case opposes at least a portion of the plurality of first driving rollers in the axial direction;
   the at least the portion of the first motor case is attachable to a mobile body main body of the mobile body;
   a second drive assembly, which is another one of the pair of drive assemblies, includes:
   a second motor;
   a second motor case accommodating the second motor;
   a second drive force transmission rotating about the rotation axis; and
   a plurality of second driving rollers in the second drive force transmission along the circumferential direction and coming into contact with at least a portion of the plurality of driven rollers from an other side in the axial direction;

the second drive force transmission rotates to transmit drive force of the second motor to the main wheel via the plurality of second driving rollers;

at least a portion of the second motor case opposes at least a portion of the plurality of second drive rollers in the axial direction;

at least one of the at least a portion of the first motor case and the at least a portion of the second motor case is attachable to the mobile body main body;

the first drive assembly further includes a first decelerator on a load side of the first motor case in the axial direction to decelerate a rotation speed of an output shaft of the first motor;

the at least a portion of the first motor case is a front bracket connected to the first decelerator;

the second drive assembly further includes a second decelerator on a load side of the second drive assembly in the axial direction with respect to the second motor case to decelerate a rotation speed of an output shaft of the second motor; and the at least a portion of the second motor case is a front bracket connected to the second decelerator.

2. The rotary drive device according to claim 1, wherein both the at least a portion of the first motor case and the at least a portion of the second motor case are attachable to the mobile body main body.

3. The rotary drive device according to claim 1, wherein the at least a portion of the first motor case is positioned on a load side of the first motor case in the axial direction relative to a center portion of the first motor case between an end surface of an anti-load side of the first motor case and an end surface of the load side of the first motor case; and the at least a portion of the second motor case is positioned on a load side of the second motor case in the axial direction relative to a center portion of the second motor case between an end surface of an anti-load side of the second motor case and an end surface of the load side of the second motor case.

4. The rotary drive device according to claim 1, wherein the first motor case has a cylindrical shape extending in the axial direction;

the at least a portion of the first motor case overlaps, along the axial direction, a recessed region recessed radially inward with respect to the rotational axis;

the second motor case includes a cylindrical shape extending in the axial direction; and the at least a portion of the second motor case overlaps, along the axial direction, another recessed region recessed radially inward with respect to the rotational axis.

5. The rotary drive device according to claim 1, wherein the first motor case includes:

a first body portion accommodating the first motor; and a first flange portion projecting from the first body portion radially outward with respect to the rotation axis;

the at least a portion of the first motor case defines the first flange portion;

the second motor case includes:

a second body portion accommodating the second motor; and a second flange portion projecting from the second body portion radially outward with respect to the rotation axis; and the at least a portion of the second motor case defines the second flange portion.

6. A rotary drive device provided on a mobile body, the rotary drive device comprising:

a main wheel rotatable about a rotation axis; and a pair of drive assemblies opposing each other in an axial direction along the rotation axis, each of the pair of drive assemblies drives the main wheel; wherein the main wheel includes a plurality of driven rollers along a circumferential direction relative to the rotation axis;

a first drive assembly, which is one of the pair of drive assemblies, includes:

a first motor;

a first motor case accommodating the first motor;

a first drive force transmission rotating about the rotation axis; and a plurality of first driving rollers in the first drive force transmission along the circumferential direction and contacting at least a portion of the plurality of driven rollers from one side of the rotary drive device in the axial direction;

the first drive force transmission rotates to transmit drive force of the first motor to the main wheel via the plurality of first driving rollers;

at least a portion of the first motor case opposes at least a portion of the plurality of first driving rollers in the axial direction;

the at least the portion of the first motor case is attachable to a mobile body main body of the mobile body;

a second drive assembly, which is another one of the pair of drive assemblies, includes:

a second motor;

a second motor case accommodating the second motor;

a second drive force transmission rotating about the rotation axis; and a plurality of second driving rollers in the second drive force transmission along the circumferential direction and coming into contact with at least a portion of the plurality of driven rollers from an other side in the axial direction;

the second drive force transmission rotates to transmit drive force of the second motor to the main wheel via the plurality of second driving rollers;

at least a portion of the second motor case opposes at least a portion of the plurality of second drive rollers in the axial direction;

at least one of the at least a portion of the first motor case and the at least a portion of the second motor case is attachable to the mobile body main body;

the first motor case includes:

a first body portion accommodating the first motor; and a first flange portion projecting from the first body portion radially outward with respect to the rotation axis;

the at least a portion of the first motor case defines the first flange portion;

the second motor case includes:

a second body portion accommodating the second motor; and a second flange portion projecting from the second body portion radially outward with respect to the rotation axis; and the at least a portion of the second motor case defines the second flange portion;

the first flange portion includes:

a first attachment portion attachable to the mobile body main body; and a first cover portion radially outside the first driving roller with respect to the rotation axis;

the first cover portion extends from the first attachment portion toward one of the plurality of driven rollers;

the second flange portion includes:

a second attachment portion attachable to the mobile body main body; and a second cover portion radially outside the second driving roller with respect to the rotation axis; and the second cover portion extends from the second attachment portion toward one of the plurality of driven rollers.

7. The rotary drive device according to claim 6, wherein the first cover portion is vertically below the first driving roller; and the second cover portion is vertically below the second driving roller.

* * * * *